(12) United States Patent
Wells (10) Patent No.: US 10,270,233 B2
(45) Date of Patent: Apr. 23, 2019

(54) MANUALLY-OPERATED WIRE STRIPPER

(71) Applicant: Bartley Alan Wells, Newark, OH (US)

(72) Inventor: Bartley Alan Wells, Newark, OH (US)

(*) Notice: Subject to any disclaimer, the term of this patent is extended or adjusted under 35 U.S.C. 154(b) by 215 days.

(21) Appl. No.: 15/240,453

(22) Filed: Aug. 18, 2016

(65) Prior Publication Data

US 2017/0098925 A1 Apr. 6, 2017

Related U.S. Application Data

(60) Provisional application No. 62/235,910, filed on Oct. 1, 2015.

(51) Int. Cl.
*H02G 1/12* (2006.01)

(52) U.S. Cl.
CPC ............ *H02G 1/126* (2013.01); *H02G 1/127* (2013.01); *H02G 1/1217* (2013.01); *H02G 1/1224* (2013.01); *H02G 1/1263* (2014.07); *H02G 1/1273* (2013.01)

(58) Field of Classification Search
CPC ...... H02G 1/126; H02G 1/127; H02G 1/1217; H02G 1/1265; H02G 1/1248; H02G 1/1256
See application file for complete search history.

(56) References Cited

U.S. PATENT DOCUMENTS

| | | | | |
|---|---|---|---|---|
| 843,353 A * | 2/1907 | McKenna | ............ | H02G 1/1224 30/90.1 |
| 1,784,298 A * | 12/1930 | Mahan | ................. | H02G 1/1265 29/DIG. 83 |
| 2,554,126 A * | 5/1951 | Schwartz | ............ | H02G 1/1256 81/9.51 |
| 3,630,105 A * | 12/1971 | Rider | ................... | H02G 1/1265 81/9.51 |
| 6,308,417 B1 * | 10/2001 | Ducret | ................ | H02G 1/1231 30/90.7 |

* cited by examiner

*Primary Examiner* — Monica Carter
*Assistant Examiner* — Danny Hong (57) ABSTRACT

A manually-operated wire stripper is a device for cutting and removing the electrical insulation from an electrical wire. The device includes a base plate onto which a first mounting plate and a second mounting plate are perpendicularly mounted. A first rod is rotatably mounted through the first mounting plate and the second mounting plate. A cutting assembly is mounted for longitudinal movement to the first rod and may be moved into position such that a blade of the cutting assembly is aligned with a selected slot from a plurality of wire slots traversing through the base plate. An electrical wire may be stripped by inserting the electrical wire through the selected slot, creating a cut in the electrical insulation with the blade, and then manually pulling the electrical wire through the selected slot to remove the electrical insulation along the length of the electrical wire.

8 Claims, 9 Drawing Sheets

SECTION A-A

MANUALLY-OPERATED WIRE STRIPPER

The current application claims a priority to the U.S. Provisional Patent application Ser. No. 62/235,910 filed on Oct. 1, 2015.

FIELD OF THE INVENTION

The present invention relates generally to a device for removing the electrical insulation from electric wires. More specifically, the present invention is a manually-operated wire stripper that is utilized to cut and remove the electrical insulation from electrical wires of a wide range of sizes.

BACKGROUND OF THE INVENTION

Electrical wires are utilized for a wide variety of applications. Conventional electrical wires are sheathed in an insulation material such as silicone rubber or ethylene propylene diene monomer (EPDM) rubber. Electrical insulation generally serves to restrict the flow of electric current in order to greatly reduce the possibility of conducting electricity under the influence of an electric field. Electrical wires are frequently recycled after use. The removal of electrical insulation is a common step of the recycling process, but can be both time-consuming and costly. A common method of removing electrical insulation is by melting the insulation material off of the electrical wire's metal core. A downside of this method is the substantial energy investment and negative environmental effects of melting the insulation material. As a result, a more convenient and straightforward means of removing insulation material from an electrical wire is desirable.

The present invention is a manually-operated wire stripper that is utilized for cutting and removing the electrical insulation from electrical wires. The present invention is able to accommodate a wide range of electrical wire sizes. A blade is utilized to create an incision in the electrical insulation of an electrical wire. The wire may then be pulled manually in order to cut and remove the electrical insulation along the length of the electrical wire.

DETAIL DESCRIPTIONS OF THE INVENTION

All illustrations of the drawings are for the purpose of describing selected versions of the present invention and are not intended to limit the scope of the present invention.

The present invention is a manually-operated wire stripper for cutting and removing the electrical insulation from an electrical wire. The present invention is shown in FIGS. 1-9 and comprises a base plate 1, a first mounting plate 4, a second mounting plate 5, a first rod 6, a cutting assembly 7, and a plurality of wire slots 11.

The base plate 1 is a planar structure onto which the remaining components of the present invention are positioned. The first mounting plate 4 and the second mounting plate 5 are utilized to support and offset the first rod 6 from the surface of the base plate 1. The first mounting plate 4 is perpendicularly mounted to a first end 2 of the base plate 1 while the second mounting plate 5 is perpendicularly mounted to a second end 3 of the base plate 1, opposite to the first mounting plate 4. As a result, the first rod 6 is positioned along the length of the base plate 1. The first rod 6 supports the cutting assembly 7 and allows the position of the cutting assembly 7 to be adjusted. The first rod 6 is rotatably mounted through the first mounting plate 4 and the second mounting plate 5, ensuring that the first mounting plate 4 and the second mounting plate 5 are able to support the first rod 6 while allowing the first rod 6 to rotate freely. In the preferred embodiment of the present invention, the first rod 6 is rotated in order to adjust the position of the cutting assembly 7 along the first rod 6.

The cutting assembly 7 comprises a carriage 8 and a blade 9. The carriage 8 is the portion of the cutting assembly 7 that is able to move along the first rod 6 while the blade 9 is utilized to cut into the electrical insulation of an electrical wire. The blade 9 is connected to the carriage 8, allowing the position of the blade 9 to be adjusted by moving the carriage 8 along the first rod 6. The carriage 8 is mounted for longitudinal movement to the first rod 6, enabling the position of the carriage 8 to be adjusted along the length of the first rod 6. In the preferred embodiment of the present invention, the carriage 8 is moved by rotating the first rod 6 and the carriage 8 is able to move via helical engagement with the first rod 6.

The plurality of wire slots 11 allows electrical wires of various sizes to be pulled through the plurality of wire slots 11. The plurality of wire slots 11 traverses perpendicularly through the base plate 1, forming channels through the base plate 1 into which wires may be inserted when removing electrical insulation. The blade 9 is centrally aligned with each of the plurality of wire slots 11 and may be moved into position adjacent to a selected slot from the plurality of wire slots 11 based on the size of the electrical wire to be stripped. The blade 9 is utilized to create an incision on the electrical insulation of a wire that is inserted through the selected slot. The wire is then pulled through the selected slot, allowing the blade 9 to cut the electrical insulation along the length of the wire.

The present invention further comprises a second rod 12. The second rod 12 provides further support to the cutting assembly 7 during positional adjustment. The second rod 12 is mounted to the first mounting plate 4 and the second mounting plate 5, adjacent to the first rod 6. This allows the carriage 8 to be supported by both the first rod 6 and the second rod 12. The second rod 12 is oriented parallel to the first rod 6, ensuring that the carriage 8 is evenly supported by both the first rod 6 and the second rod 12. The carriage 8 is slidably engaged along the second rod 12, ensuring that the carriage 8 is able to slide along the second rod 12 as the first rod 6 is turned.

In the preferred embodiment of the present invention, the second rod 12 and the first rod 6 are removably mounted to the first mounting plate 4 and the second mounting plate 5. The carriage 8 may thus be removed from the first rod 6 and the second rod 12 and reoriented relative to the plurality of wire slots 11 if desired by the user. Additionally, the first mounting plate 4 and the second mounting plate 5 are removably mounted to the base plate 1 to facilitate the process of removing and reorienting the carriage 8 as needed. The present invention further comprises a plurality of fasteners 13 that is utilized to secure the first mounting plate 4 and the second mounting plate 5 to the base plate 1. The plurality of fasteners 13 is removably engaged into the base plate 1 through the first mounting plate 4 and the second mounting plate 5. This allows the first mounting plate 4 and the second mounting plate 5 to be easily removed from the base plate 1 by removing the plurality of fasteners 13.

The present invention further comprises a leveraging handle 14 that facilitates the rotation of the first rod 6. The leveraging handle 14 is terminally and torsionally connected to the first rod 6. As a result, rotational motion provided by the user through the leveraging handle 14 is transferred to the first rod 6, allowing the position of the carriage 8 on the first rod 6 to be adjusted.

The carriage 8 comprises a carriage fastener 15 that serves to secure the carriage 8 to the first rod 6 while allowing the carriage 8 to be moved along the first rod 6 when the first rod 6 is rotated. In the preferred embodiment of the present invention, the first rod 6 and the carriage fastener 15 are threaded to provide a helical engagement between the first rod 6 and the carriage fastener 15 and to allow the carriage fastener 15 to move based on movement of the first rod 6. The carriage fastener 15 is helically engaged with the first rod 6. As a result, the carriage fastener 15 along with the carriage 8 are able to move along the first rod 6 as the first rod 6 is rotated.

Figure 1:
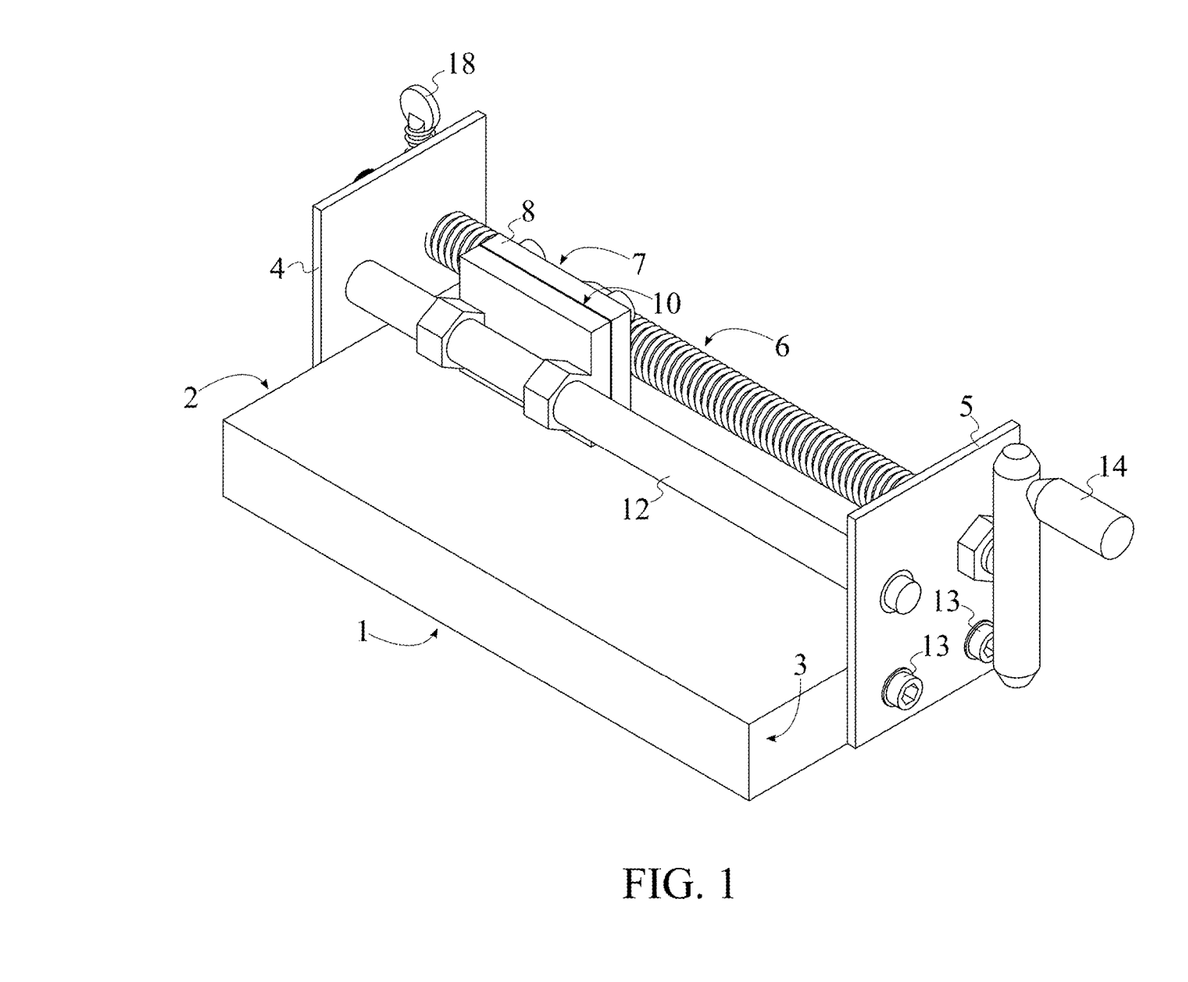
FIG. 1 is a perspective view of the present invention.
Figure 2:
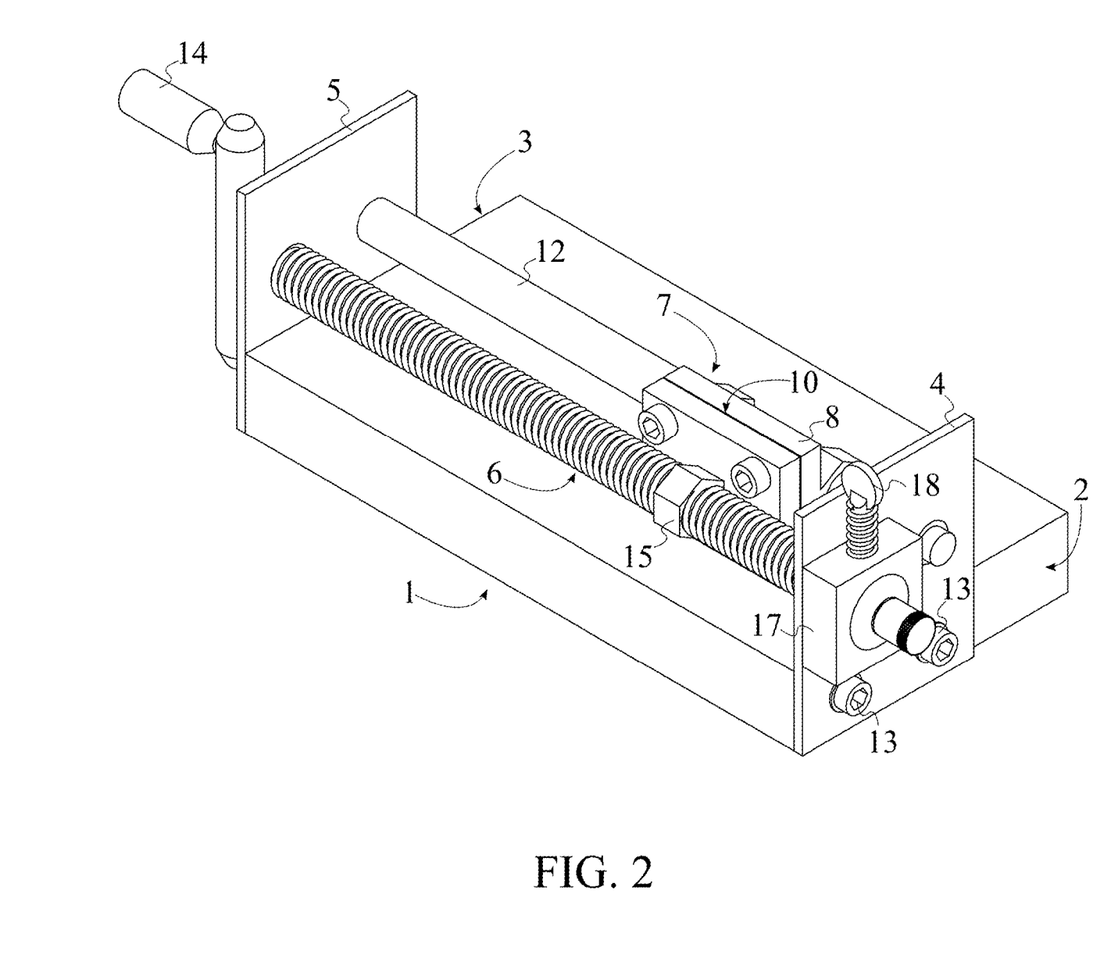
FIG. 2 is an alternate perspective view of the present invention.
Figure 3:
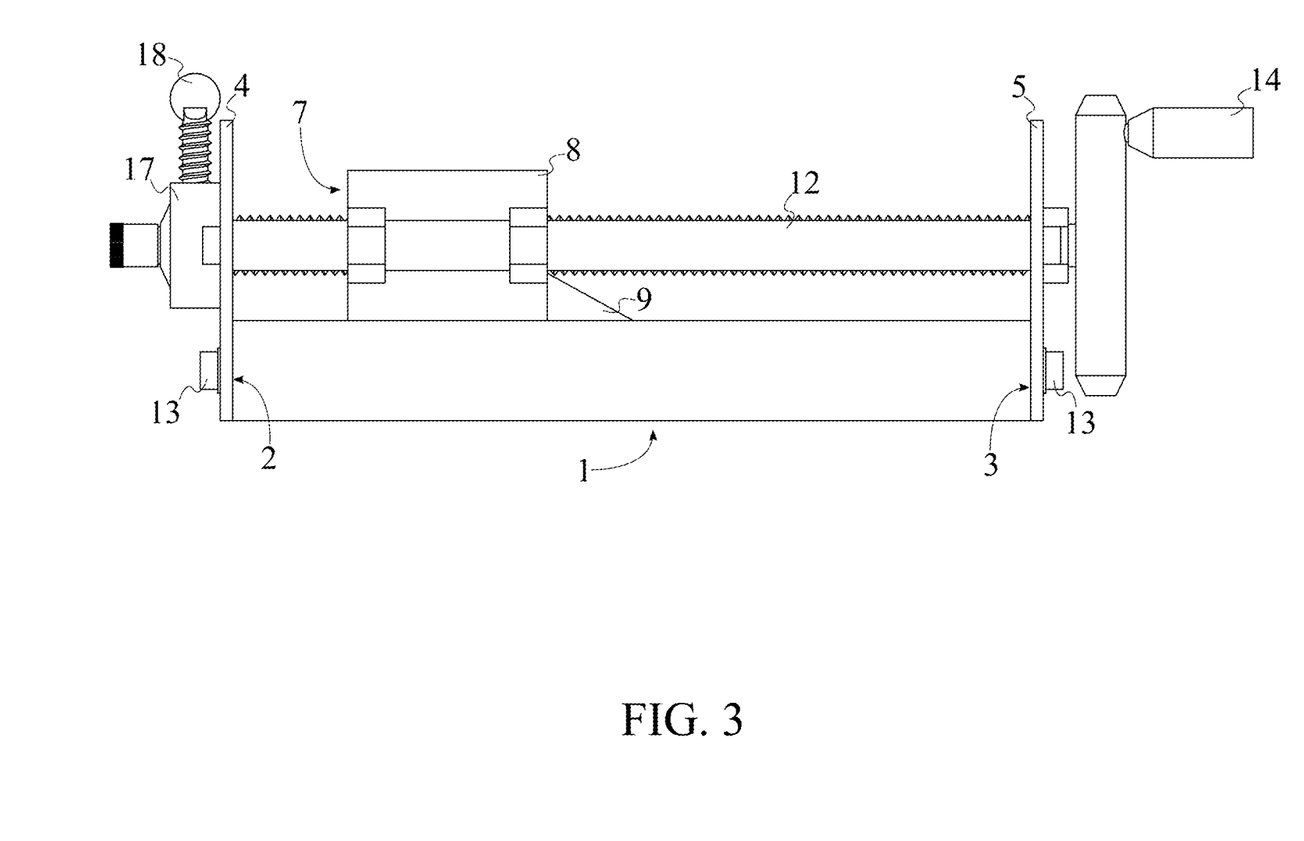
FIG. 3 is a front view of the present invention.
Figure 4:
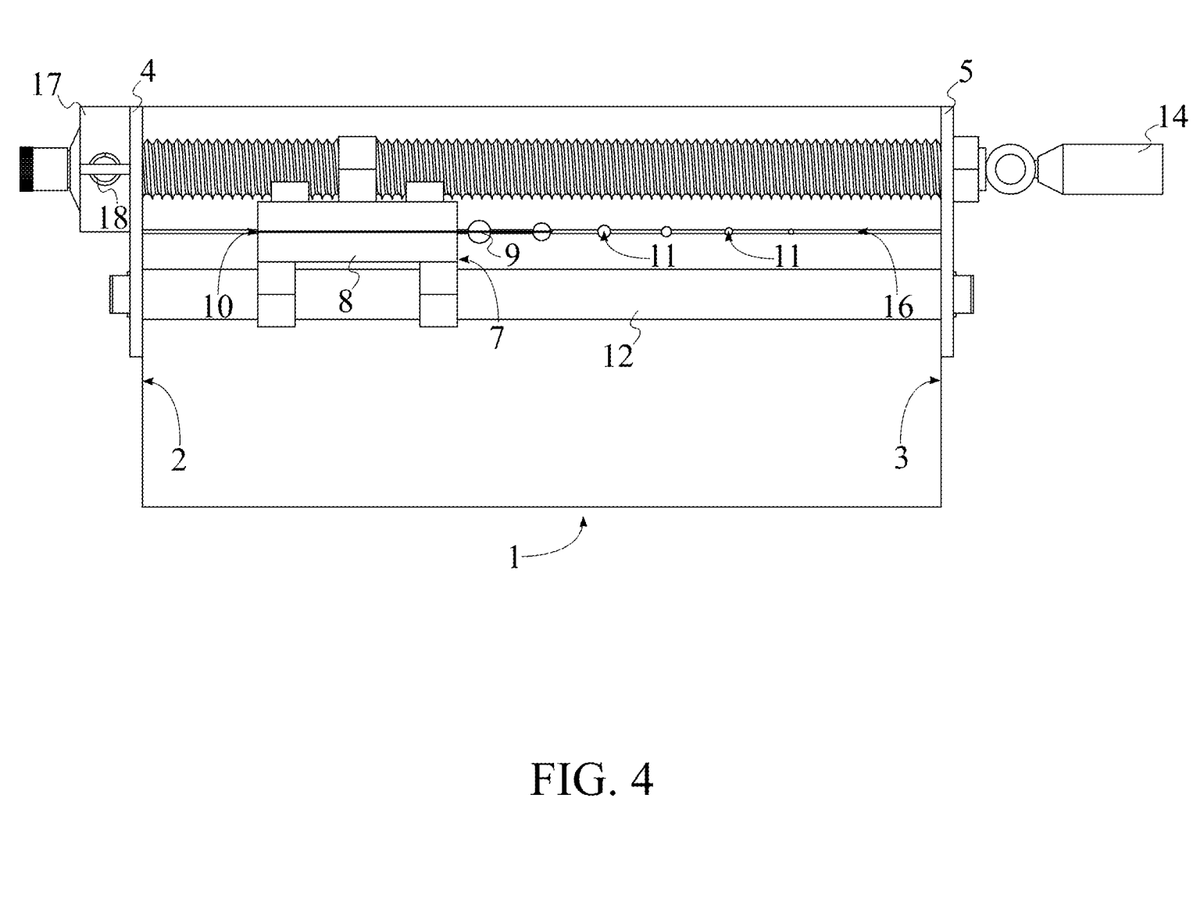
FIG. 4 is a top view of the present invention.
Figure 5:
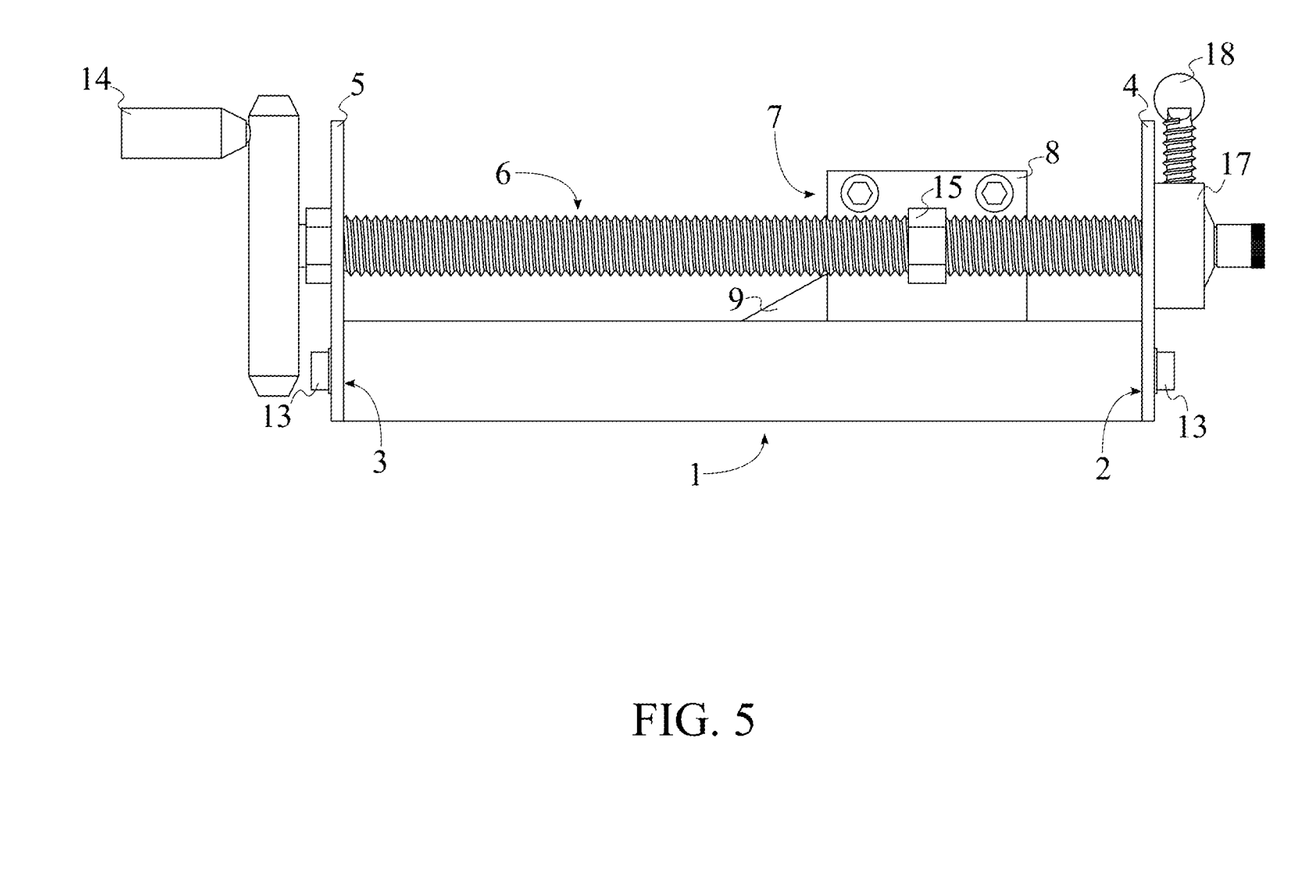
FIG. 5 is a rear view of the present invention.
Figure 6:
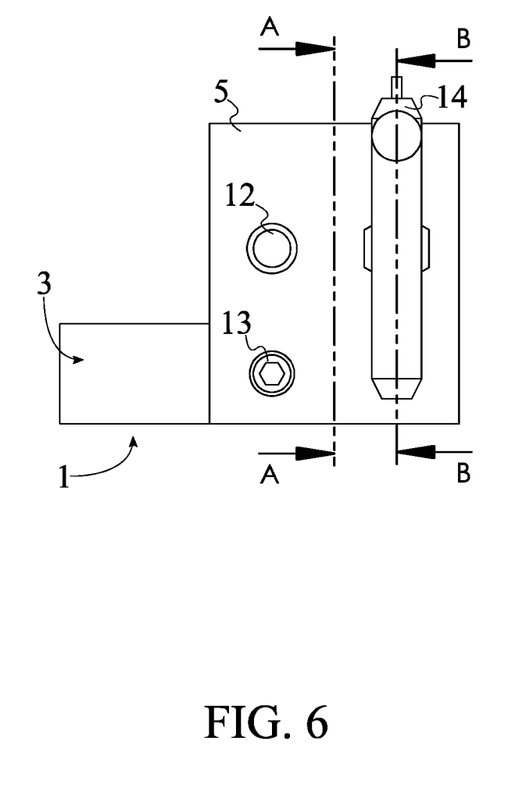
FIG. 6 is a side view of the present invention.
Figure 7:
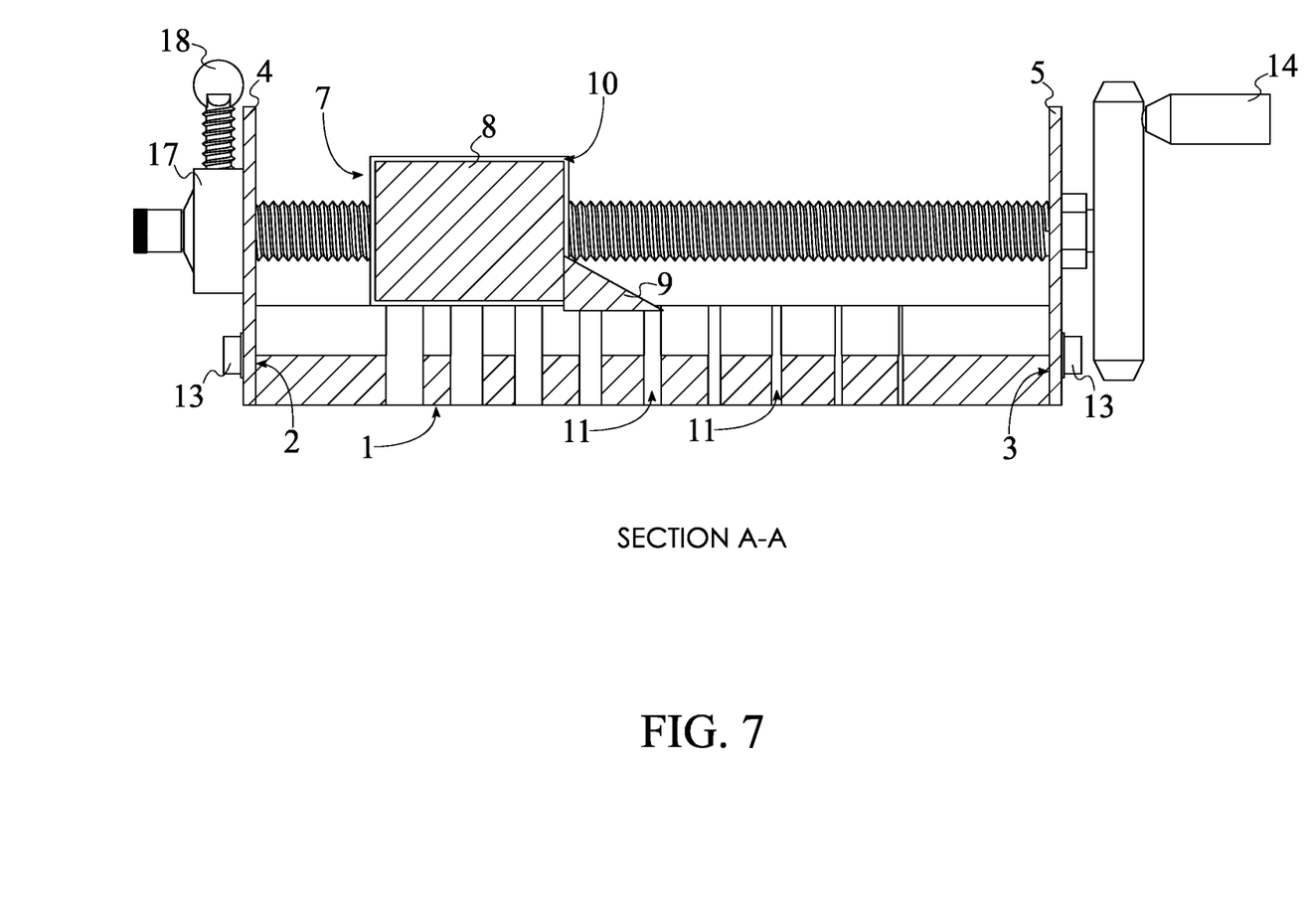
FIG. 7 is a cross-sectional view of the present invention taken along line A-A of FIG. 6.

As shown in FIG. 4, the present invention further comprises an elongated cutting slot 16. The elongated cutting slot 16 serves as a track for the blade 9 when the carriage 8 is moved into position before cutting the electrical insulation of an electrical wire. The plurality of wire slots 11 is linearly distributed along the base plate 1. As a result, the plurality of wire slots 11 is distributed in an arrangement such that the carriage 8 may be adjusted to position the blade 9 next to a selected slot from the plurality of wire slots 11. The elongated cutting slot 16 traverses into the base plate 1 and the plurality of wire slots 11, forming a track for the blade 9. The blade 9 is slidably engaged into the elongated cutting slot 16, allowing the blade 9 to move within the elongated cutting slot 16 until the blade 9 is in the desired position next to the selected slot from the plurality of wire slots 11.

The cutting assembly 7 further comprises a blade slot 10 that accommodates the blade 9 within the carriage 8. The blade slot 10 traverses laterally into the carriage 8, forming an opening within the carriage 8 into which the blade 9 may be inserted. The blade 9 is removably engaged into the blade slot 10, allowing the blade 9 to be removed and replaced or repositioned on the carriage 8 as desired.

Figure 8:
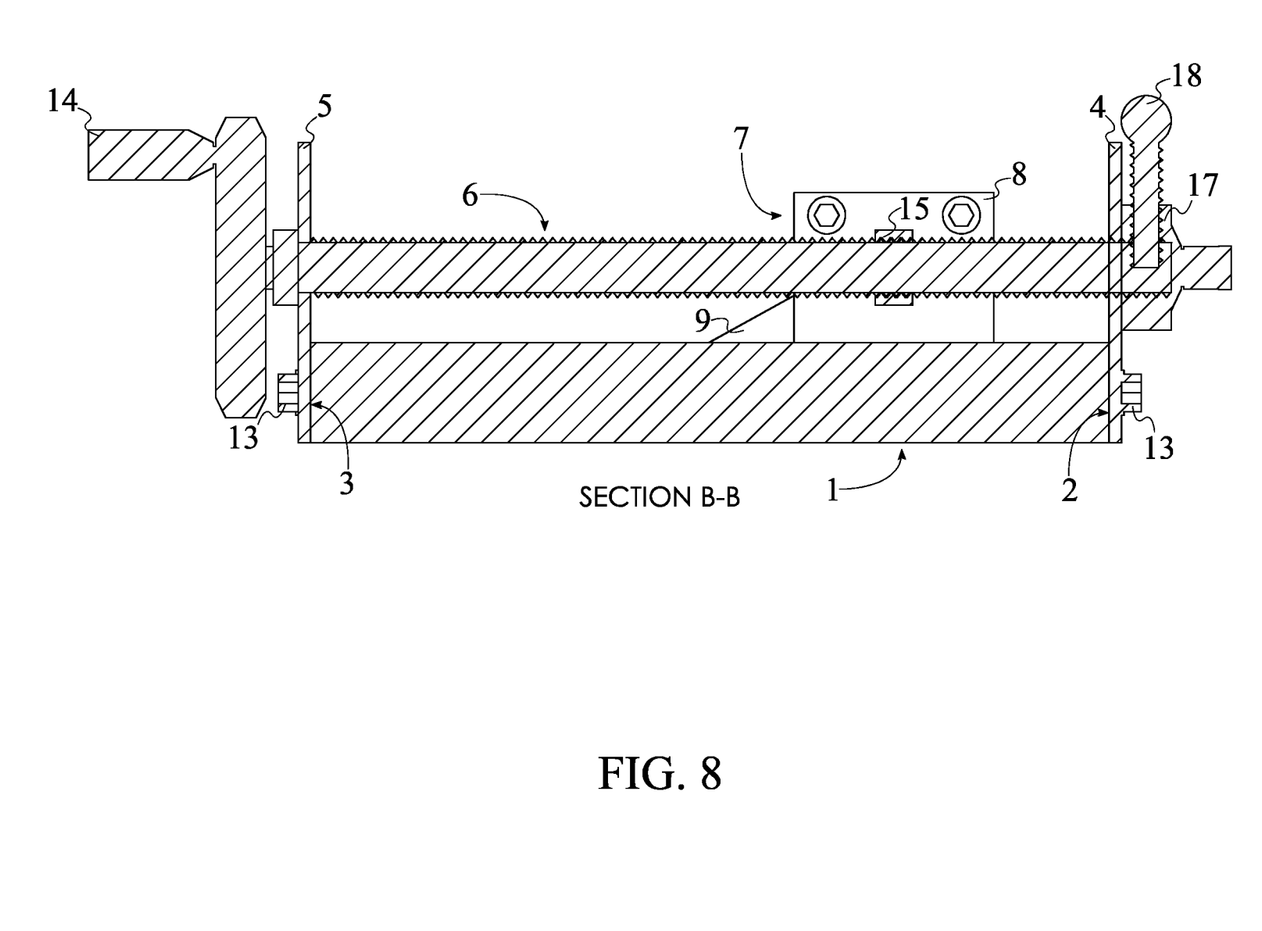
FIG. 8 is a cross-sectional view of the present invention taken along line B-B of FIG. 6.
Figure 9:
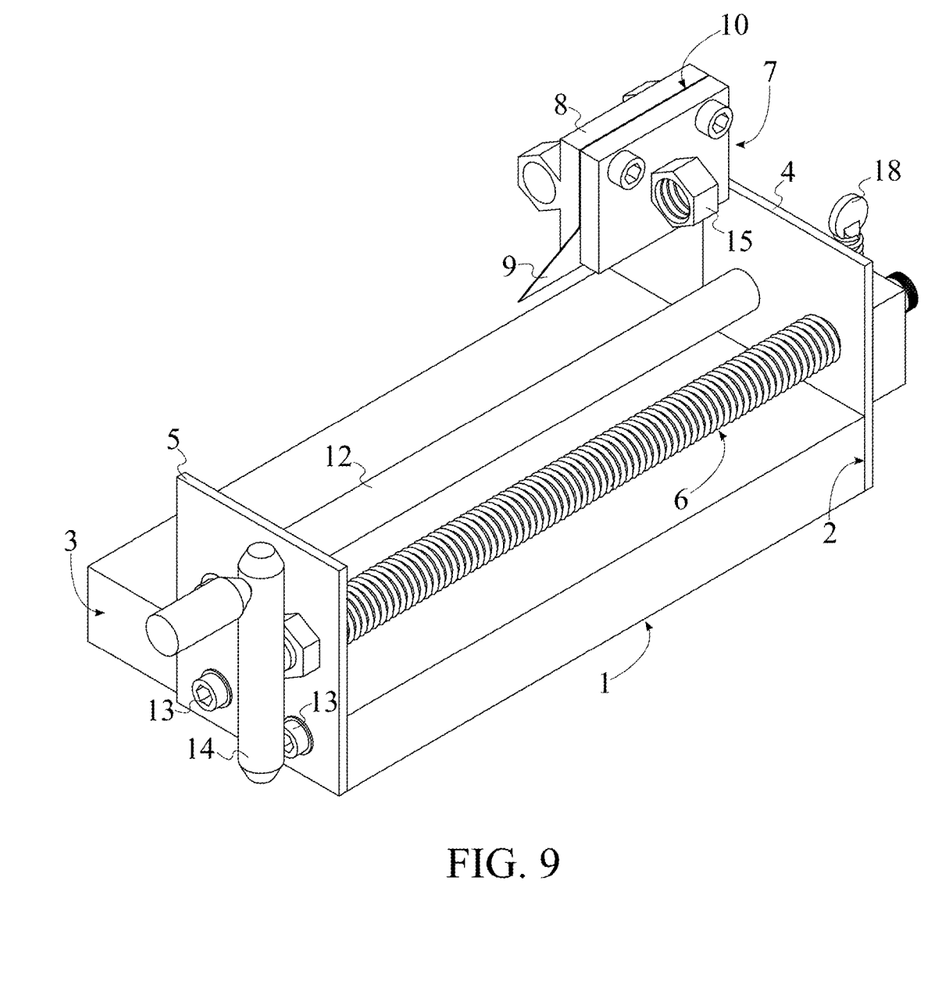
FIG. 9 is a perspective exploded view of the present invention.

The present invention further comprises a lock housing 17 and a locking pin 18 that are utilized to prevent further rotation of the first rod 6 after the carriage 8 has been moved to a desired position. The lock housing 17 is adjacently connected to the first mounting plate 4 in a manner such that the first rod 6 may be positioned into the lock housing 17. The first rod 6 traverses into the lock housing 17 and the locking pin 18 may thus be inserted into the lock housing 17 to prevent rotation of the first rod 6. The locking pin 18 is removably engaged into the lock housing 17 and the first rod 6 as shown in FIG. 8. The locking pin 18 may thus be engaged into the first rod 6 to prevent rotation of the first rod 6 and removed from the first rod 6 when the user wishes to rotate the first rod 6 to adjust the position of the carriage 8. The locking pin 18 is oriented perpendicular to the first rod 6 to prevent rotation of the first rod 6 when the first rod 6 is turned clockwise or counterclockwise.

Although the present invention has been explained in relation to its preferred embodiment, it is understood that many other possible modifications and variations can be made without departing from the spirit and scope of the present invention as hereinafter claimed.

What is claimed is:

1. A manually-operated wire stripper comprising:
a base plate;
a first mounting plate;
a second mounting plate;
a first rod;
a second rod;
a leveraging handle;
a cutting assembly;
a plurality of wire slots;
an elongated cutting slot;
the cutting assembly comprising a carriage and a blade;
the first mounting plate being perpendicularly mounted to a first end of the base plate;
the second mounting plate being perpendicularly mounted to a second end of the base plate, opposite to the first mounting plate;
the first rod being rotatably mounted through the first mounting plate and the second mounting plate;
the leveraging handle being terminally and torsionally connected to the first rod;
the second rod being mounted to the first mounting plate and the second mounting plate, adjacent to the first rod;
the second rod being oriented parallel to the first rod;
the blade being connected to the carriage;
the carriage being mounted for longitudinal movement to the first rod;
the carriage being slidably engaged along the second rod;
the carriage comprising a carriage fastener;
the first rod and the carriage fastener being threaded;
the carriage fastener being helically engaged with the first rod;
the plurality of wire slots traversing perpendicularly through the base plate;
the plurality of wire slots being linearly distributed along the base plate;
the elongated cutting slot traversing into the base plate and the plurality of wire slots;
the elongated cutting slot being oriented parallel to the first rod and the second rod;
the blade being slidably engaged into the elongated cutting slot; and
the blade being centrally aligned with each of the plurality of wire slots.

2. The manually-operated wire stripper as claimed in claim 1 comprising:
the second rod being removably mounted to the first mounting plate and the second mounting plate.

3. The manually-operated wire stripper as claimed in claim 1 comprising:
the first rod being removably mounted to the first mounting plate and the second mounting plate.

4. The manually-operated wire stripper as claimed in claim 1 comprising:
the first mounting plate and the second mounting plate being removably mounted to the base plate.

5. The manually-operated wire stripper as claimed in claim 4 comprising:
a plurality of fasteners; and the plurality of fasteners being removably engaged into the base plate through the first mounting plate and the second mounting plate.

6. The manually-operated wire stripper as claimed in claim 1 comprising:
the cutting assembly comprising a blade slot;
the blade slot traversing laterally into the carriage; and
the blade being removably engaged into the blade slot.

7. The manually-operated wire stripper as claimed in claim 1 comprising:
a lock housing;
the lock housing being adjacently connected to the first mounting plate; and
the first rod traversing into the lock housing.

8. The manually-operated wire stripper as claimed in claim 7 comprising:
a locking pin;
the locking pin being removably engaged into the lock housing and the first rod; and
the locking pin being oriented perpendicular to the first rod.

\* \* \* \* \*